US010645728B2

(12) United States Patent
Cui et al.

(10) Patent No.: US 10,645,728 B2
(45) Date of Patent: May 5, 2020

(54) WIRELESS COMMUNICATION DEVICE AND WIRELESS COMMUNICATION METHOD

(71) Applicants: Sony Corporation, Tokyo (JP); Qimei Cui, Beijing (CN); Haowei Wang, Beijing (CN); Jiahui Liu, Beijing (CN); Xiang Zhou, Beijing (CN); Xiaofeng Tao, Beijing (CN); Bingshan Hu, Beijing (CN)

(72) Inventors: Qimei Cui, Beijing (CN); Haowei Wang, Beijing (CN); Jiahui Liu, Beijing (CN); Xiang Zhou, Beijing (CN); Xiaofeng Tao, Beijing (CN); Bingshan Hu, Beijing (CN)

(73) Assignee: SONY CORPORATION, Tokyo (JP)

( * ) Notice: Subject to any disclaimer, the term of this patent is extended or adjusted under 35 U.S.C. 154(b) by 38 days.

(21) Appl. No.: 15/765,294

(22) PCT Filed: Oct. 31, 2016

(86) PCT No.: PCT/CN2016/104024
§ 371 (c)(1),
(2) Date: Apr. 2, 2018

(87) PCT Pub. No.: WO2017/076254
PCT Pub. Date: May 11, 2017

(65) Prior Publication Data
US 2018/0310337 A1   Oct. 25, 2018

(30) Foreign Application Priority Data
Nov. 5, 2015  (CN) .......................... 2015 1 0745705

(51) Int. Cl.
*H04L 12/413* (2006.01)
*H04W 74/08* (2009.01)
(Continued)

(52) U.S. Cl.
CPC ....... *H04W 74/0816* (2013.01); *H04W 16/14* (2013.01); *H04W 72/04* (2013.01);
(Continued)

(58) Field of Classification Search
CPC ........... H04W 74/0816; H04W 74/006; H04W 72/1289; H04W 16/14; H04W 72/1252;
(Continued)

(56) References Cited

U.S. PATENT DOCUMENTS 8,934,909 B2 *  1/2015  Koskela ................ H04W 28/08
                                          370/395.41
9,031,017 B2 *  5/2015  Ratasuk ............ H04W 72/1215
                                          370/329
(Continued)

FOREIGN PATENT DOCUMENTS

CN    103765824 A     4/2014
CN    104717686 A     6/2015
WO    2013006988 A1   1/2013

OTHER PUBLICATIONS

Supplementary European Search Report dated Sep. 12, 2018 in EP 16 86 1522.
International Search Report dated Jan. 22, 2017 in PCT/CN2016/104024 filed Oct. 31, 2016.

*Primary Examiner* — Hanh N Nguyen
(74) *Attorney, Agent, or Firm* — Xsensus LLP

(57) ABSTRACT

A wireless communication device and a wireless communication method. The wireless communication device for use on a base station side includes one or more processors. The processor is configured to determine start time and end time of data transmission on one or more auxiliary carriers on an unlicensed frequency band. The processor is further configured to control to send indication information about the start time and the end time to other base stations.

17 Claims, 14 Drawing Sheets

(51) Int. Cl.
  *H04W 16/14* (2009.01)
  *H04W 72/12* (2009.01)
  *H04W 72/04* (2009.01)
  *H04W 74/00* (2009.01)

(52) U.S. Cl.
  CPC ... *H04W 72/1215* (2013.01); *H04W 72/1252* (2013.01); *H04W 72/1289* (2013.01); *H04W 74/006* (2013.01)

(58) Field of Classification Search
  CPC ......... H04W 72/1215; H04W 72/1284; H04W 74/0808; H04W 72/0453; H04W 16/26; H04W 24/10
  See application file for complete search history.

(56) References Cited

U.S. PATENT DOCUMENTS

| | | | |
|---|---|---|---|
| 9,853,797 B2* | 12/2017 | Tabet | H04W 28/085 |
| 10,206,223 B2* | 2/2019 | Belghoul | H04L 1/1887 |
| 2014/0044105 A1 | 2/2014 | Bontu et al. | |
| 2014/0378157 A1 | 12/2014 | Wei et al. | |
| 2015/0023315 A1 | 1/2015 | Yerramalli et al. | |
| 2015/0085683 A1 | 3/2015 | Sadek et al. | |
| 2015/0245232 A1* | 8/2015 | Luo | H04W 24/08 |
| | | | 370/252 |
| 2016/0066322 A1 | 3/2016 | Bontu et al. | |
| 2016/0360525 A1* | 12/2016 | Cheng | H04L 5/001 |

* cited by examiner

WIRELESS COMMUNICATION DEVICE AND WIRELESS COMMUNICATION METHOD

FIELD

The present disclosure generally relates to the field of wireless communication, and in particular to wireless communication device and wireless communication method.

BACKGROUND

An important issue in frequency reuse for licensed assisted access (LAA) is how to fairly compete with other access mechanisms (such as the Wi-Fi and the LAA of other operators) for an unlicensed frequency band. In addition, interference in the unlicensed frequency band is involved in the frequency reuse for LAA.

SUMMARY

In the following, an overview of the embodiments of the present disclosure is given to provide basic understanding about some aspects of the present disclosure. It should be understood that the overview below is neither an exhaustive overview of the present disclosure, nor intended to determine a critical part or an important part or the scope of the present disclosure. An object of the overview is only to give some concepts in a simplified manner, and hereby serves as a preamble of a more detailed description given later.

According to an embodiment, a wireless communication device for base station side includes at least one processor. The processor is configured to determine, for one or more secondary carriers in an unlicensed frequency band, a start time and an end time for data transmission on a respective secondary carrier. The processor is further configured to send indication information regarding the start time and the end time to another base station.

According to another embodiment, a wireless communication method for base station side includes a step of determining, for one or more secondary carriers in an unlicensed frequency band, a start time and an end time for data transmission on a respective secondary carrier. The method further includes a step of controlling to send indication information regarding the start time and the end time to another base station.

According to yet another embodiment, a wireless communication device for base station side includes at least one processor. The processor is configured to parse indication information from another base station, the indication information indicates a start time and an end time for data transmission on one or more secondary carriers in an unlicensed frequency band. The processor is further configured to control, based on the indicated start time and the indicated end time, data transmission of the current base station on a respective secondary carrier, such that an end time for the data transmission on the respective secondary carrier is not later than the indicated end time.

According to another embodiment, a wireless communication method for base station side includes a step of parsing indication information from another base station, the indication information indicates a start time and an end time for data transmission on one or more secondary carriers in an unlicensed frequency band. The method further includes a step of controlling, based on the indicated start time and the indicated end time, data transmission of the current base station on the secondary carrier, such that an end time for the data transmission is not later than the indicated end time.

According to another embodiment, an electronic device on the side of mobility management entity includes at least one processor. The processor is configured to determine multiple base stations operating in a same unlicensed frequency band. The processor is further configured to specify and notify one of the multiple base stations for determining a start time and an end time for data transmission of the multiple base stations on one or more secondary carriers in the unlicensed frequency band.

According to another embodiment, a communication control method on the side of mobility management entity includes a step of determining multiple base stations operating in a same unlicensed frequency band. The method further includes a step of specifying and notifying one of the multiple base stations for determining a start time and an end time for data transmission of the multiple base stations on one or more secondary carriers in the unlicensed frequency band.

BRIEF DESCRIPTION OF THE DRAWINGS

The present disclosure may be better understood with reference to the description given in conjunction with the drawings hereinafter. The same or similar components are denoted as the same or similar reference characters throughout the drawings. The drawings together with the detailed description below are incorporated in the specification and form a part of the specification, for further exemplifying preferred embodiments of the present disclosure and explaining the principle and advantages of the present disclosure. In the drawings.

DETAILED DESCRIPTION OF EMBODIMENTS

Figure 1:
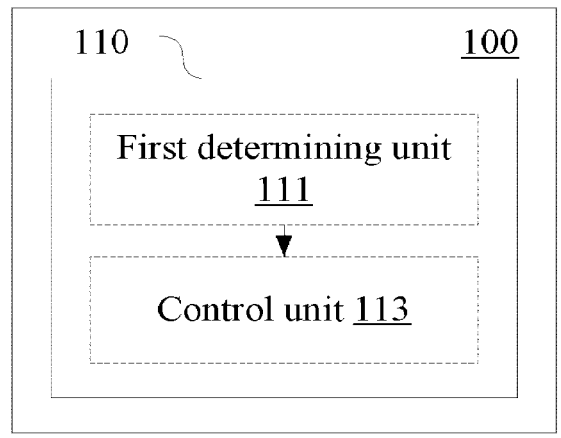
FIG. 1 is a block diagram showing a configuration example of a wireless communication device for base station side according to an embodiment of the present disclosure.

Hereinafter, the embodiments of the present disclosure are described by referring to the drawings. Elements and features described in one of the drawings or one embodiment of the present disclosure may be combined with elements and features shown in one or more other drawings or embodiments. It should be noted that, for clarity, components and processing irrelative to the present disclosure or known to those skilled in the art are not shown and described in the drawings and the specification.

Before describing the embodiments of the present disclosure, an example of an application scenario of the embodiments of the present disclosure is described briefly.

Figure 23:
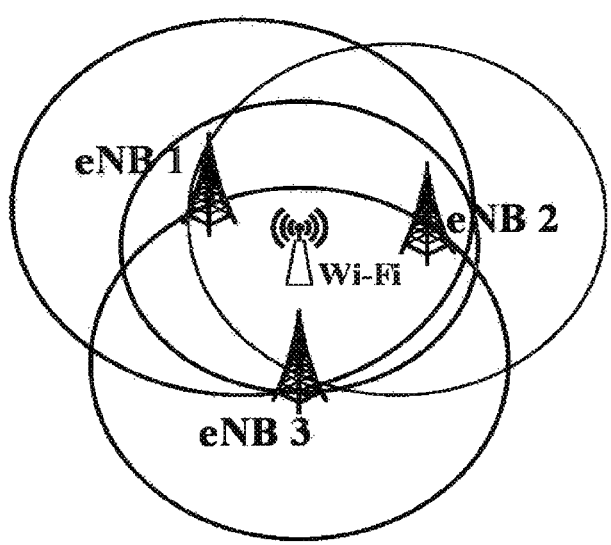
FIG. 23 is a schematic diagram showing an example in which coverage areas of base stations are overlapped.

One of design goals of LAA is to ensure that LAA competes fairly with other access mechanism for an unlicensed frequency band. The other access mechanism includes, for example, LAA of other operators and the like. An object of the embodiments of the present disclosure is to further ensure fair competition of frequency reuse for LAA. Taking FIG. 23 as an example, assuming that eNB1, eNB2 and eNB3 are deployed by a same operator, coverage areas of the three base stations have a large overlapped portion in the case of dense deployment, and there is a Wi-Fi access point in the overlapped portion.

Figure 16A:
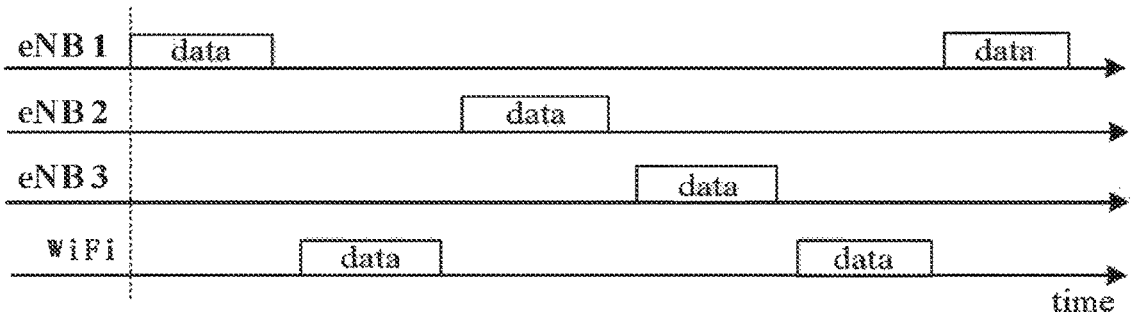
FIGS. 16a to 16c are schematic diagrams showing occupation statuses of an unlicensed frequency band.

Firstly, considering a case where there is no frequency reuse for LAA: eNB1, eNB2, eNB3 and a Wi-Fi access point compete for an unlicensed frequency band (a secondary carrier), assuming that an occupation status of the unlicensed frequency band in a time period is as shown in FIG. 16a.

Figure 16B:
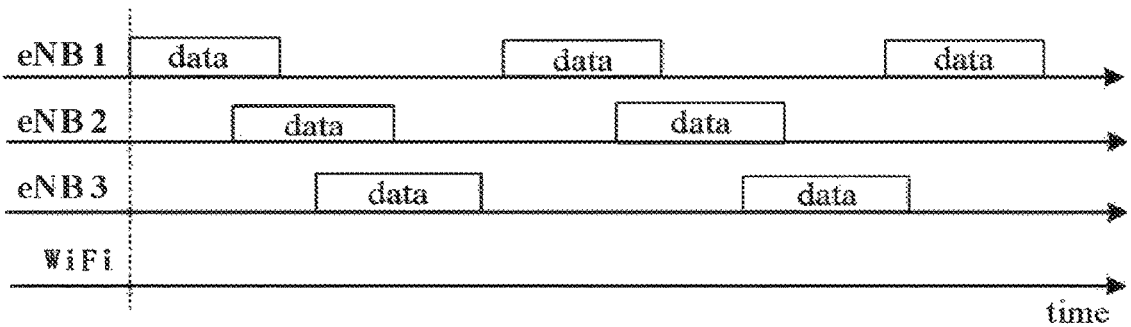

Next, considering a case where there is frequency reuse for LAA: assuming that an occupation status of an unlicensed frequency band by eNB1, eNB2, eNB3 and the Wi-Fi access point in a time period is as shown in FIG. 16b.

It can be seen by comparing FIG. 16a with FIG. 16b that, the Wi-Fi may be difficult to occupy the unlicensed frequency band in the case where there is a frequency reuse for LAA. This is because base stations for LAA may always occupy a channel in the case where there is frequency reuse. For example, in a case where eNB2 in FIG. 16b detects that the channel is occupied when performing listen before talk (LBT), and eNB2 may determine with a method for implementing the frequency reuse for LAA that a base station which is occupying the channel belongs to the same operator as eNB2, then eNB2 may occupy the channel. In this case, once a base station for LAA occupies an unlicensed frequency band, a base station adjacent to the base station and belonging to the same operator may occupy the channel through frequency reuse. Thus, a probability that other access mechanism (including a Wi-Fi access point, a base station of another operator) occupies the unlicensed frequency band can be reduced greatly, which results in an unfair competition for the unlicensed frequency band. The embodiments of the present disclosure are provided to solve, for example, the unfair competition problem in the above frequency reuse for LAA.

As shown in FIG. 1, a wireless communication device 100 according to an embodiment includes a processor 110. The processor 110 includes a first determining unit 111 and a control unit 113. It should be noted that, although the first determining unit 111 and the control unit 113 are shown as functional modules in FIG. 1, it should be understood that functions of the first determining unit 111 and the control unit 113 may also be implemented as a whole by the processor 110, and are not necessarily implemented by separated components in the processor 110. In addition, although the processor 110 is shown as one block in FIG. 1, the communication device 100 may include multiple processors, and functions of the first determining unit 111 and the control unit 113 can be distributed to the multiple processors. In this case, the functions may be implemented by cooperative operation of the multiple processors.

The first determining unit 111 is configured to determine, for one or more secondary carriers in an unlicensed frequency band, a start time and an end time for data transmission on a respective secondary carrier. The control unit 113 is configured to control to send first indication information regarding the start time and the end time to another base station.

The first indication information may contain a start time and an end time for data transmission on each secondary carrier (also referred to as a secondary cell (SCell)) operating in the unlicensed frequency band. The end time may prescribe that any eNB operating in the unlicensed frequency band must ends data transmission at the end time. In this way, a time period is reserved for other access mechanisms (for example, Wi-Fi, base stations of other operations for LAA) to fairly compete for the unlicensed frequency band.

Figure 16C:
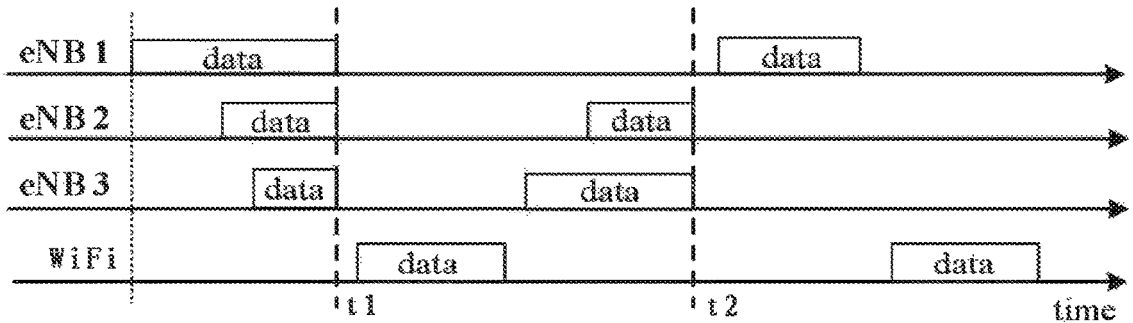

For example, as shown in FIG. 16c, since it is defined that base stations for frequency reuse ends data transmission simultaneously (such as t1 and t2 shown in FIG. 16c), other access mechanisms (for example, the Wi-Fi, base stations of other operators for LAA) can obtain an equal opportunity for occupying the unlicensed frequency band.

According to an embodiment, the first determining unit 111 may be configured to determine the start time and the end time for the data transmission in the following way:

performing LBT on each secondary carrier to determine a maximum occupation time of the respective secondary carrier, and determining a start time and an end time of the maximum occupation time as the start time and the end time for the data transmission on the respective secondary carrier.

In addition, the first determining unit 111 may determine the start time and the end time for the data transmission periodically (for example, taking an LTE frame as a period). Alternatively, when a current base station is to perform data transmission on one of the secondary carriers, the first determining unit 111 may determine a start time and an end time for the secondary carrier.

Accordingly, in the case where the start time and the end time are determined periodically, the control unit 113 may control to periodically send first indication information regarding the start time and the end time to another base station. In the case where the start time and the end time corresponding to the secondary carrier are determined when the current base station is to perform data transmission on the secondary carrier, the control unit 113 may control to send indication information corresponding to the secondary carrier after the start time and the end time are determined.

The wireless communication device according to the above embodiment may be applied to a base station selected from multiple base stations using the same unlicensed frequency band, for determining the start time and the end time described above, and sending corresponding indication information to other base stations. In the present disclosure and the drawings, the base station for determining the start time and the end time described above may be referred to as an eNB head. A method for determining the eNB head will be described later in conjunction with a specific embodiment.

Next, a frequency reuse cluster is described briefly. eNBs of the same operator which operate in a same unlicensed frequency band are defined as a frequency reuse cluster.

Figure 17:
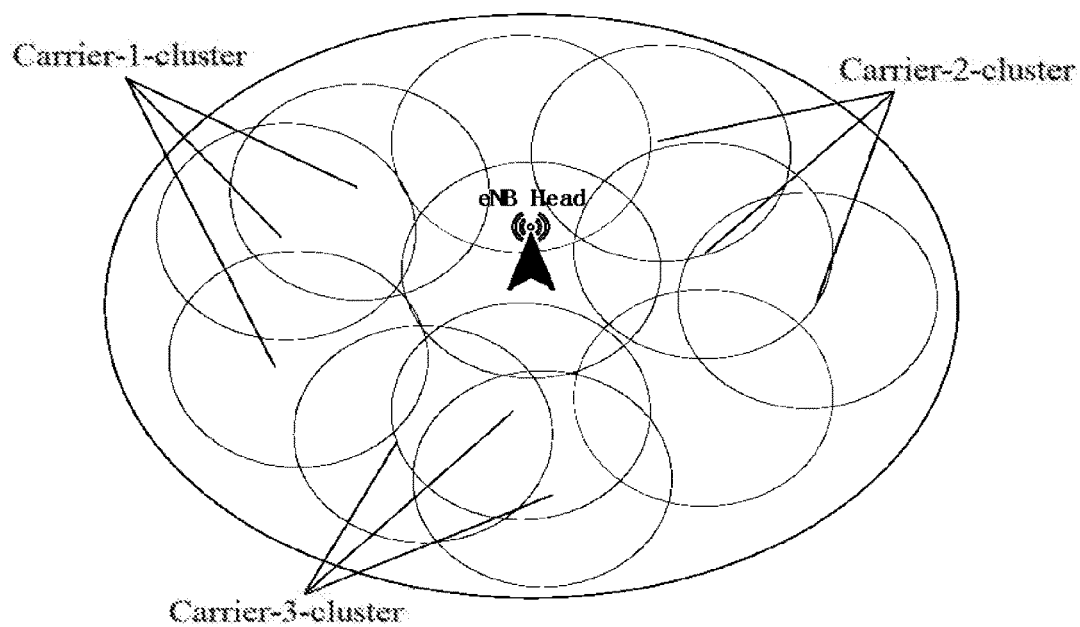
FIG. 17 is a schematic diagram showing an example of a frequency reuse cluster.

One frequency reuse cluster corresponds to one unlicensed frequency band. The eNBs in the same frequency reuse cluster may transmit data based on the start time and the end time for data transmission indicated by the above first indication information. In addition, the frequency reuse cluster may be dynamically changed with time. FIG. 17 shows a schematic diagram of a frequency reuse cluster in a certain region at a certain time.

According to an embodiment, the above first indication information may be sent in a special subframe. Alternatively, the above first indication information is sent in a multicast broadcast single frequency network (MBSFN) subframe.

Below, an exemplary configuration of signaling for sending the first indication information described above is described.

The signaling may be configured and sent by the eNB Head. The eNB Head may perform LBT detection on an unlicensed frequency band configured for the region periodically (for example, at an LTE frame period), and may obtain a maximum occupation time (the amount of the maximum occupation time is related to a parameter q in the LBT detection) of all the unlicensed frequency bands based on a result of the LBT detection. The eNB Head may determine a start time and an end time for data transmission of the eNBs in the region in the unlicensed frequency band based on the maximum occupation time.

Figure 18:
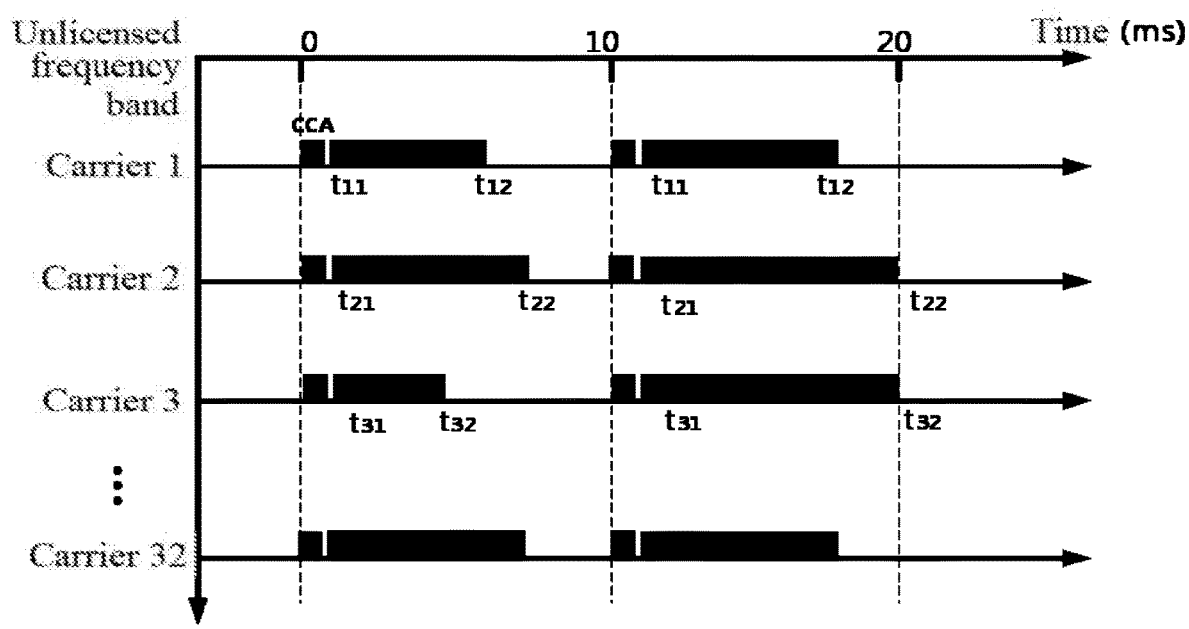
FIG. 18 is a schematic diagram showing an example of usage time determined for different carriers.

For example, FIG. 18 shows maximum occupation time obtained periodically (at a period of 10 ms) by an eNB Head for carrier 1 to carrier 32, in which start times and end times of data transmission determined for the carriers in the period are respectively represented by t11 and t12, t21 and t22 . . . .

The eNB Head may periodically send the above information to other eNBs in the region through signaling, a format of which is shown for example in the following Table 1.

TABLE 1

| Exemplary signaling format | | | | | |
|---|---|---|---|---|---|
| Unlicensed frequency band | Carrier 1 | Carrier 2 | Carrier 3 | ... | Carrier 32 |
| Start time | $t_{11}$ | $t_{21}$ | $t_{31}$ | | |
| End time | $t_{12}$ | $t_{22}$ | $t_{32}$ | | |

The eNB Head may send the signaling in a special subframe or an MBSFN subframe. In addition, other eNBs may perform LBT detection separately, and the subsequent data transmissions are performed based on the time configured in the received signaling which is sent from the eNB head.

Figure 19:
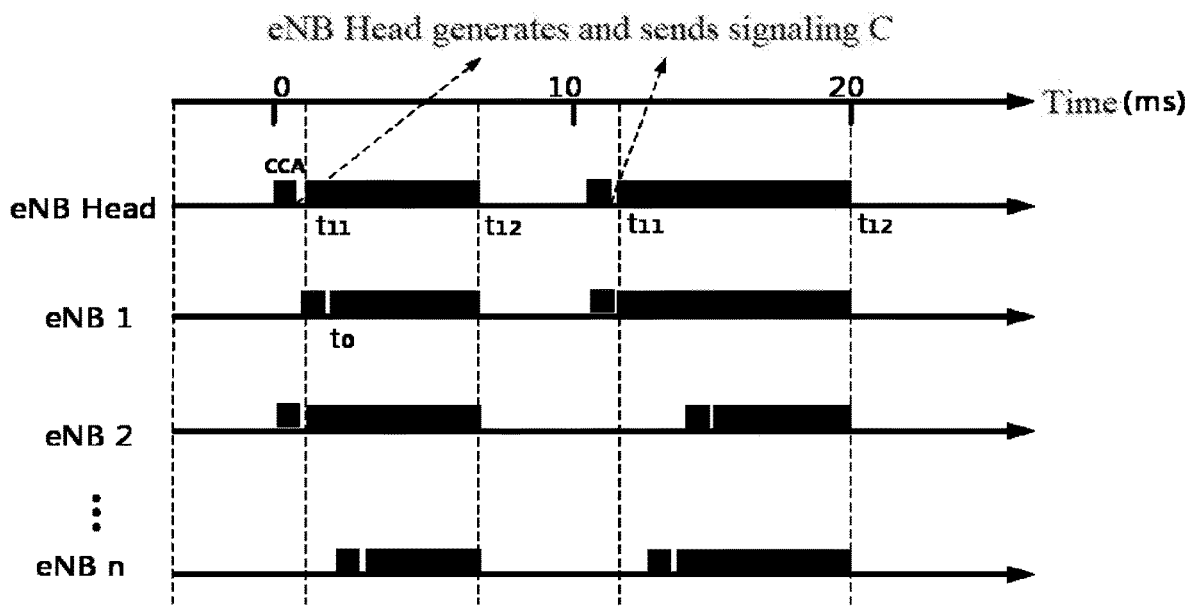
FIG. 19 is a schematic diagram showing that base stations perform data transmission based on the determined usage time of a carrier.

FIG. 19 shows an example where base stations perform data transmission based on the time indicated by the eNB Head, by taking carrier 1 as an example.

As shown in FIG. 19, upon receiving signaling sent by the eNB Head, eNB1 operating on carrier 1 at a certain time obtains that a duration for data transmission at the current time is from $t_{11}$ to $t_{12}$, and a time when eNB1 starts to occupy a channel after completing LBT detection is $t_0$, where $t_{11}<t_0<t_{12}$, Then a duration for data transmission of eNB1 is from $t_0$ to $t_{12}$, that is, the data transmission must be ended at $t_{12}$. The object of doing so is to ensure a fair competition with other access mechanism (for example, a Wi-Fi access point, base stations of other operators for LAA) for the unlicensed frequency band.

Next, a configuration example of a special subframe for sending the above first indication information is described with reference to FIG. 20.

Figure 20:
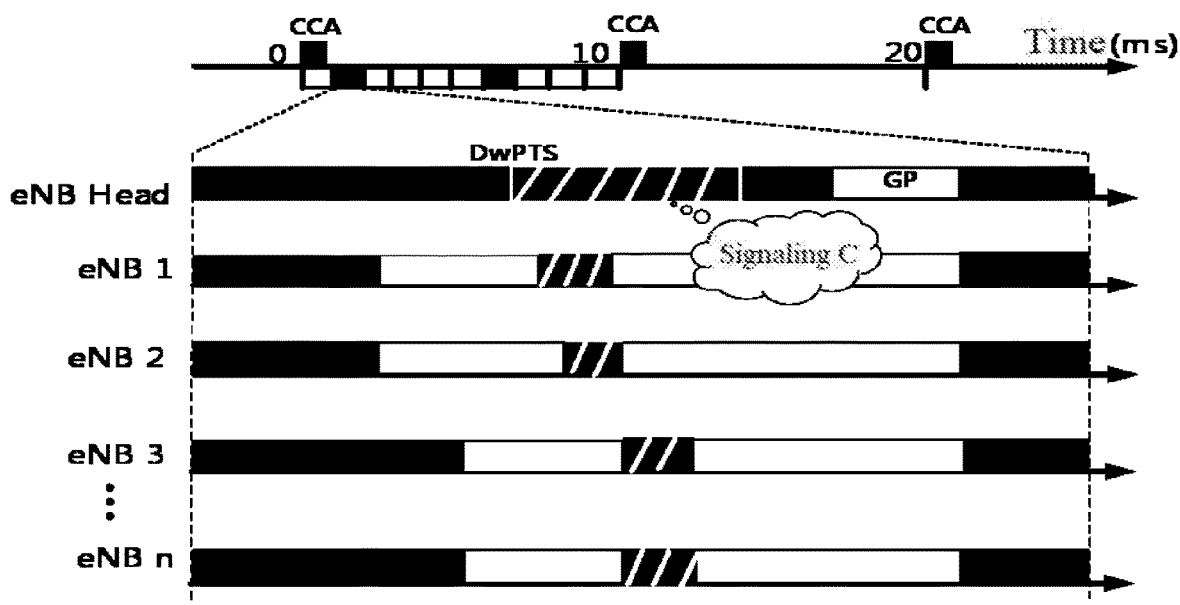
FIG. 20 is a schematic diagram showing special signaling for sending data transmission time.

As shown in FIG. 20, the eNB Head may configure a relatively long downlink pilot timeslot (DwPTS) such as eleven or twelve orthogonal frequency division multiplexing (OFDM) symbols for the special subframe. Other eNBs may configure a long guard period (GP), such as seven to ten OFDM symbols. The eNB Head sends signaling (a portion indicated by oblique shadow lines in FIG. 20) in the long DwPTS, while other eNBs are in the GPs, and thus can receive the signaling.

Figure 21:
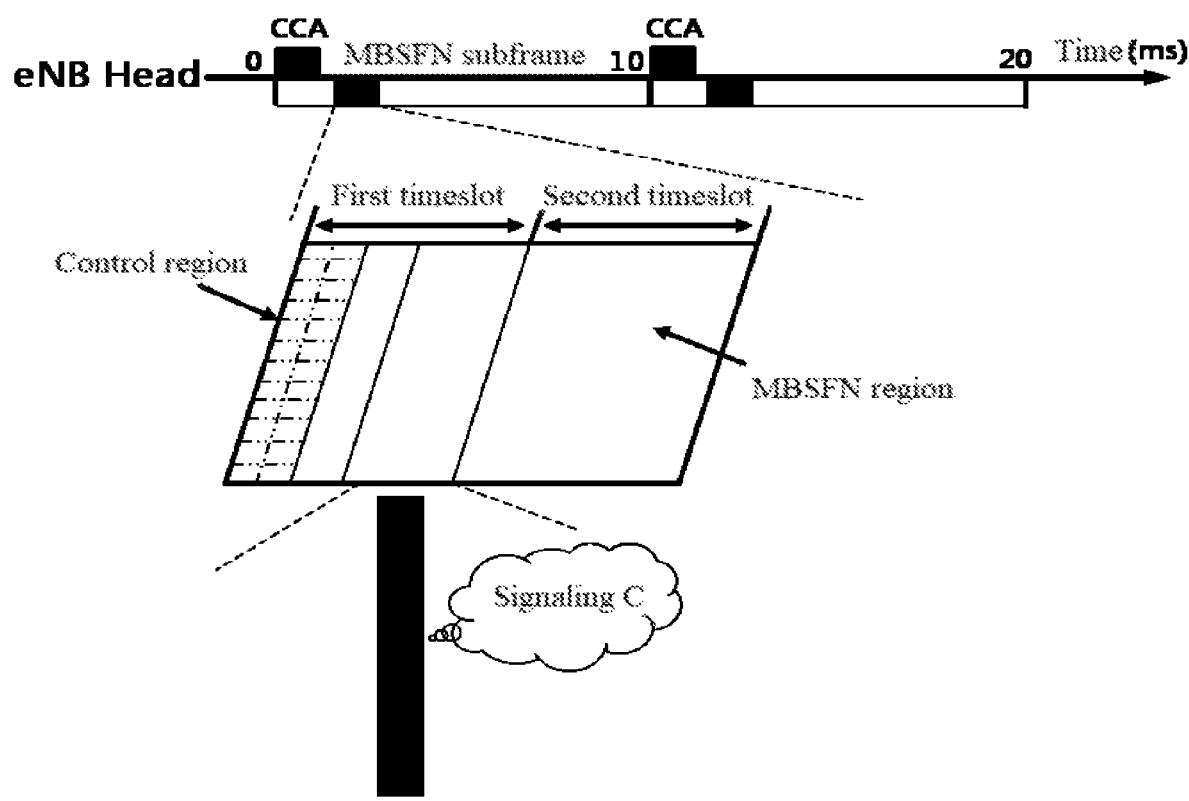
FIG. 21 is a schematic diagram showing an example in which data transmission time is sent in a multicast broadcast single frequency network subframe.

In addition, as described above, the above signaling may also be sent in an MBSFN subframe. As shown in FIG. 21, in which signaling C represents signaling containing the above first indication information.

The exemplary embodiment in an aspect of the present disclosure is described above in conjunction with an example, to mainly solve the unfair competition problem in the frequency reuse for LAA.

An embodiment in another aspect of the present disclosure may be used for a base station to reasonably select usage of carrier in an unlicensed frequency band, thereby achieving an efficient frequency reuse on the unlicensed frequency band.

Figure 2:
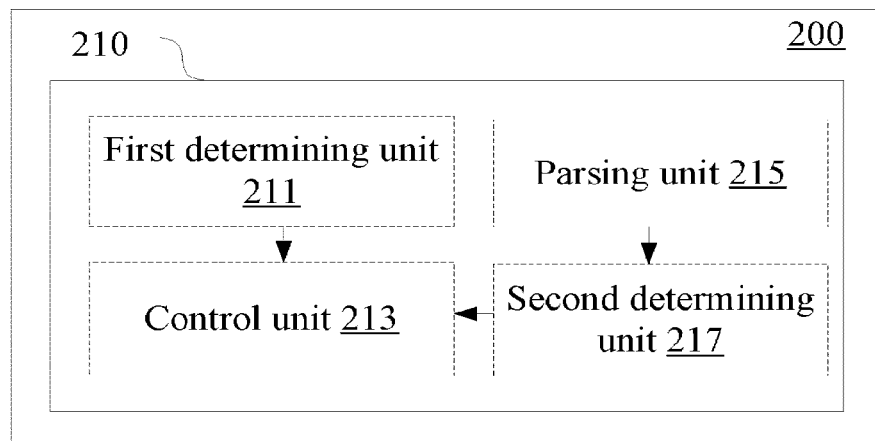
FIG. 2 is a block diagram showing a configuration example of a wireless communication device for base station side according to another embodiment.

As shown in FIG. 2, a wireless communication device for base station side according to an embodiment includes at least on processor 210. The processor 210 includes a first determining unit 211, a control unit 213, a parsing unit 215 and a second determining unit 217. Configurations of the first determining unit 211 and the control unit 213 are similar to the configurations of the first determining unit 111 and the control unit 113 described above, which are described repeatedly here anymore.

The parsing unit 215 is configured to parse second indication information from another base station. The second indication information indicates a secondary carrier which is being used by another base station.

For example, the second indication information may be received via X2 interface.

The second determining unit 217 is configured to determine the number of base stations using each secondary carrier based on the second indication information and the secondary carrier which is being used by the current base station.

In addition, the second determining unit 217 may further be configured to determine to enable and disable the secondary carrier by the current base station based on the determined number and the reference number of base stations using each secondary carrier.

The reference number of base stations using each secondary carrier may be provided by a mobility management entity (MME). According to an embodiment, the parsing unit 215 may be further configured to parse third indication information from the MME, the third indication information indicates the reference number of base stations of each secondary carrier. As further described later in conjunction with an embodiment on the side of MME, the reference number may be determined based on historical load and interference situation of each secondary carrier. Specifically, interference is lower than a predetermined level if the number of base stations is less than the reference number.

For example, the above third indication information may be received via S1 interface.

In addition to receiving, from another base station, indication information indicating the secondary carrier being used by another base station, the wireless communication device according to the embodiment of the present disclosure may also notify another base station of a secondary carrier which is being used by the current base station. According to an embodiment, the control unit 213 may be configured to control to send fourth indication information to another base station. The fourth indication information indicates a secondary carrier which is being used by the current base station.

For example, the fourth indication information may be sent via X2 interface.

Next, an exemplary manner of selecting to use a carrier in an unlicensed frequency band is described with reference to FIG. 22.

Generally, certain interference may be introduced in frequency reuse for LAA. In order to reasonably use unlicensed frequency band resources and achieve efficient frequency reuse, in an embodiment of the present disclosure, the number of eNBs carried by each secondary carrier operating in the unlicensed frequency band (i.e., the number of eNBs using the secondary carrier) is set at an appropriate level through information interaction between the eNBs. In this way, interference between eNBs with the same frequency is limited to be within a certain range, thereby achieving an efficient frequency reuse.

Figure 22:
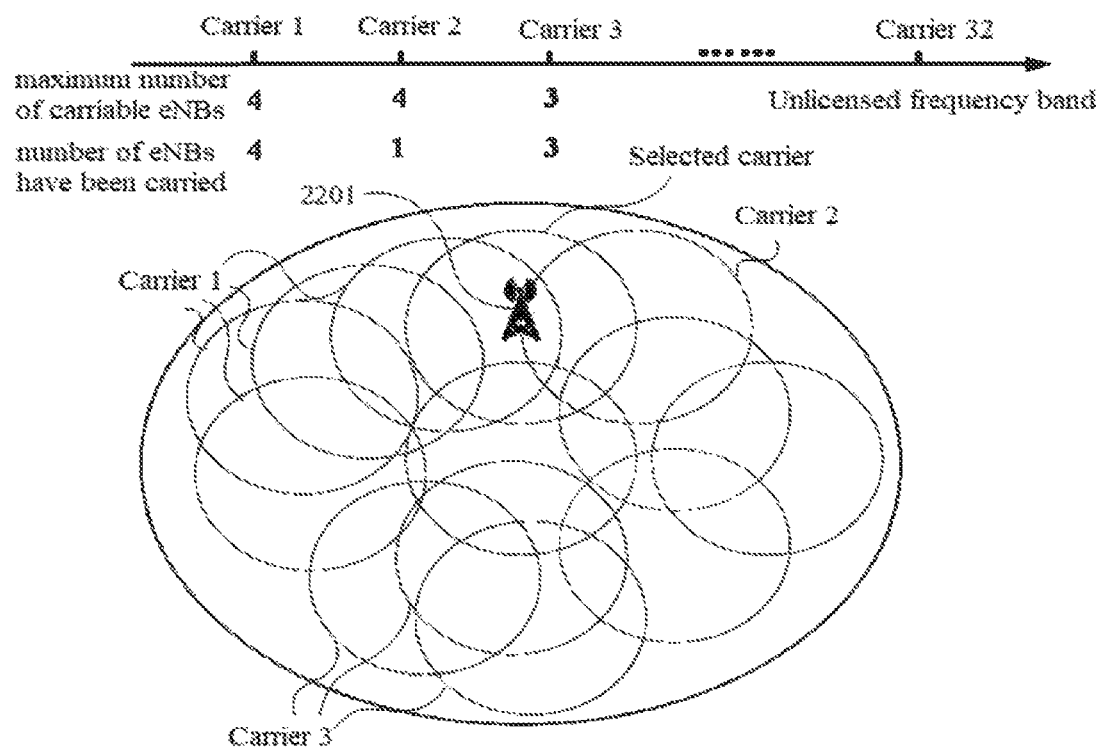
FIG. 22 is a schematic diagram showing an example of selecting a carrier.

As shown in the example of FIG. 22 above, it is assumed that eNB 2201 in FIG. 22 may acquire information on other eNBs carried by the secondary carrier in the unlicensed frequency band configured by eNB 2201. For example, as shown in FIG. 22, four eNBs are carried by carrier 1 and one eNB is carried by carrier 2. In this case, it is favorable for eNB 2201 in FIG. 22 to select to activate a secondary carrier corresponding to Carrier 2, this is because the number of eNBs for same-frequency reuse on carrier 2 is small, and the interference is relatively low.

Next, an example of signaling configuration for sending the second indication information (or the fourth indication information) and the third indication information described above are described. In the following description, the signaling for sending the above second indication information is referred to as signaling A, and the signaling for sending the above third indication information is referred to as signaling B.

Based on the deployment of an operator, the signaling A may be interacted between eNBs via X2 interface in a certain region. The signaling A includes a list of secondary carriers operating in the unlicensed frequency band which are activated by the current eNB. The signaling B may be sent to eNBs by the MME via S1 interface. The signaling B contains the maximum number of eNBs carried by each secondary carrier operating in the unlicensed frequency band. The maximum number of eNBs may be estimated based on historical load and an interference situation of each secondary carrier. Each eNB may generate a list as shown in Table 2 based on the signaling A and the signaling B.

TABLE 2

| Unlicensed frequency band | Carrier 1 | Carrier 2 | Carrier 3 | ... | Carrier 32 |
| --- | --- | --- | --- | --- | --- |
| The maximum number of eNBs carried by a carrier | 4 | 4 | 3 | ... | 2 |
| The number of eNBs which are adjacent to a current eNB and have activated the secondary carrier | 4 | 1 | 3 | ... | 2 |

Based on the list shown in the above Table 2, each eNB may determine the maximum number of eNBs carried by a secondary carrier operating in the unlicensed frequency band and the number of eNBs adjacent to a present eNB and have activated a secondary carrier. The information may indirectly represent the magnitude of same-frequency interference on each secondary carrier, and thus may serve as reference information for the eNB to select to activate a secondary carrier.

Taking eNB 2201 in FIG. 22 as an example, it can be seen from Table 2 that the maximum number of eNBs carried by a secondary carrier corresponding to carrier 1 is four while four eNBs have activated the secondary carrier, and the maximum number of eNBs carried by a secondary carrier corresponding to carrier 2 is four while only one eNB hase activated the secondary carrier. Apparently, the secondary carrier corresponding to carrier 2 has smaller same-frequency interference. Therefore, eNB 2201 may select to activate the secondary carrier corresponding to carrier 2 and perform a LBT detection, thereby achieving efficient frequency reuse in the unlicensed frequency band.

Apparently, some methods and processes are also disclosed in the above description for the wireless communication device according to the embodiment of the present disclosure.

Hereinafter, a wireless communication method according to an embodiment of the present disclosure is described without repeating the aforementioned details.

Figure 3:
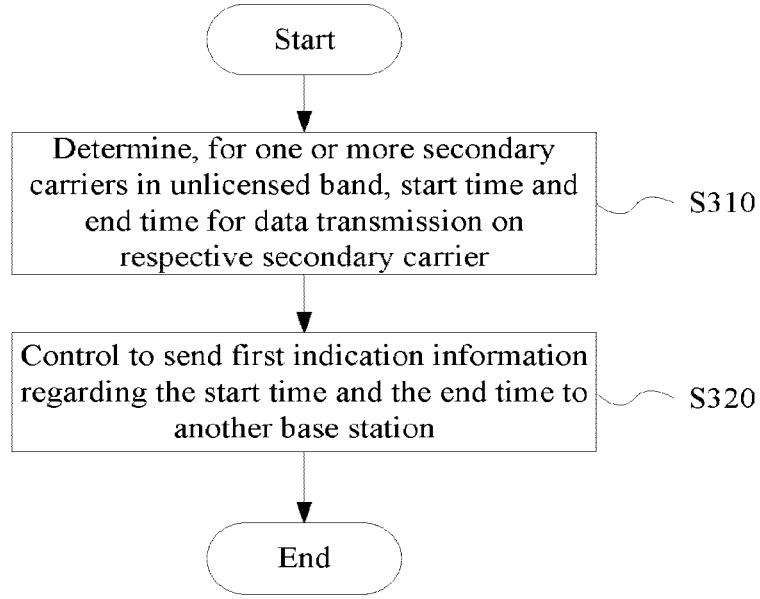
FIG. 3 is a flowchart showing a process example of a wireless communication method for base station side according to an embodiment of the present disclosure.

As shown in FIG. 3, a wireless communication method for base station side according to an embodiment includes a step S310 of determining, for one or more secondary carriers in an unlicensed frequency band, a start time and an end time for data transmission on a respective secondary carrier. In addition, the method further includes a step S320 of controlling to send first indication information regarding the start time and the end time to another base station.

In addition, the wireless communication devices described above with reference to FIG. 1 and FIG. 2 are applied to a base station selected as the aforementioned eNB Head. However, the present disclosure also includes a wireless communication device for a base station other than the eNB Head. Hereinafter, an embodiment of such wireless communication device is described without repeating the aforementioned details.

Figure 4:
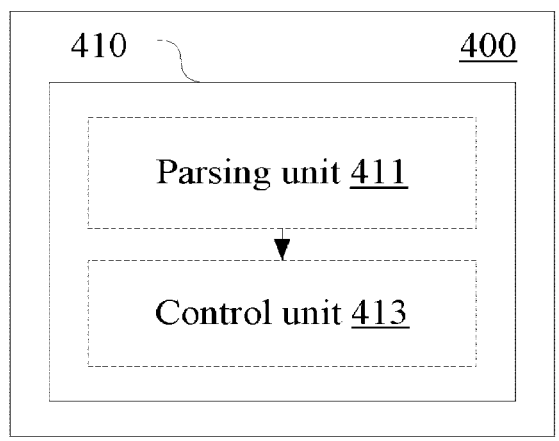
FIG. 4 is a block diagram showing a configuration example of a wireless communication device for base station side according to an embodiment of the present disclosure.

As shown in FIG. 4, a wireless communication device 400 for base station side according to an embodiment includes at least one processor 410 including a parsing unit 411 and a control unit 413.

The parsing unit 411 is configured to parse first indication information from another base station. The first indication information indicates a start time and an end time for data transmission on one or more secondary carriers in an unlicensed frequency band.

The control unit 413 is configured to control the current base station to perform data transmission on a respective secondary carrier based on the indicated start time and the indicated end time, such that an end time for the data transmission on the secondary carrier is not later than the indicated end time.

For example, the first indication information may be received in a special subframe.

As described above with reference to FIG. 20, the eNB Head may configure a relative long DwPTS such as eleven or twelve OFDM symbols, for the special subframe. The base station according to the embodiment may configure a long guard period (GP) such as seven to ten OFDM symbols, so as to be able to receive signaling.

Moreover, as described above, the first indication information may be received in the MBSFN subframe (for example, as shown in the example of FIG. 21).

In another aspect, as described above, an embodiment of the present disclosure may also be used for a base station to select a reasonable usage of a carrier in the unlicensed frequency band, thereby achieving efficient frequency reuse in the unlicensed frequency band.

Figure 5:
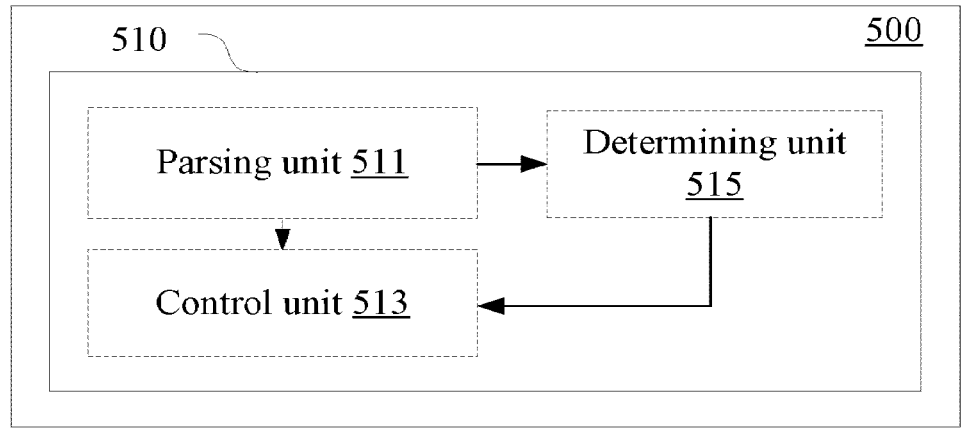
FIG. 5 is a block diagram showing a configuration example of a wireless communication device for base station side according to another embodiment.

As shown in FIG. 5, a wireless communication device 500 for base station side according to an embodiment includes at least one processor 510. The processor 510 includes a parsing unit 511, a control unit 513 and a determining unit 515. A part of configurations of the parsing unit 511 and the control unit 513 are similar to those of the parsing unit 411 and the control unit 413 described above, and are not described repeatedly hereinafter.

The parsing unit 511 is further configured to parse second indication information from another base station. The second indication information indicates the secondary carrier which is being used by another base station.

The determining unit 515 is configured to determine the number of base stations using each secondary carrier based on the second indication information and the secondary carrier which is being used by the current base station.

The determining unit 515 may be configured to determine to enable or disable the secondary carrier based on the determined number and a reference number of base stations using each secondary carrier.

The reference number of base stations using each secondary carrier may be provided by a mobility management entity (MME). According to an embodiment, the parsing unit 511 is further configured to parse third indication information from the MME. The third indication information indicates the reference number of base stations using each secondary carrier.

For example, the third indication information may be received via S1 interface.

In addition to receiving indication information of a secondary carrier which is being used by another base station from another base station, the wireless communication device according to the embodiment of the present disclosure may also notify another base station of the secondary carrier used by the current base station. According to an embodiment, the control unit 513 may further be configured to control to send fourth indication information to another base station. The fourth indication information indicates a secondary carrier which is being used by the current base station.

For example, the second indication information and the fourth indication information described above may be received and sent respectively via X2 interface.

Figure 6:
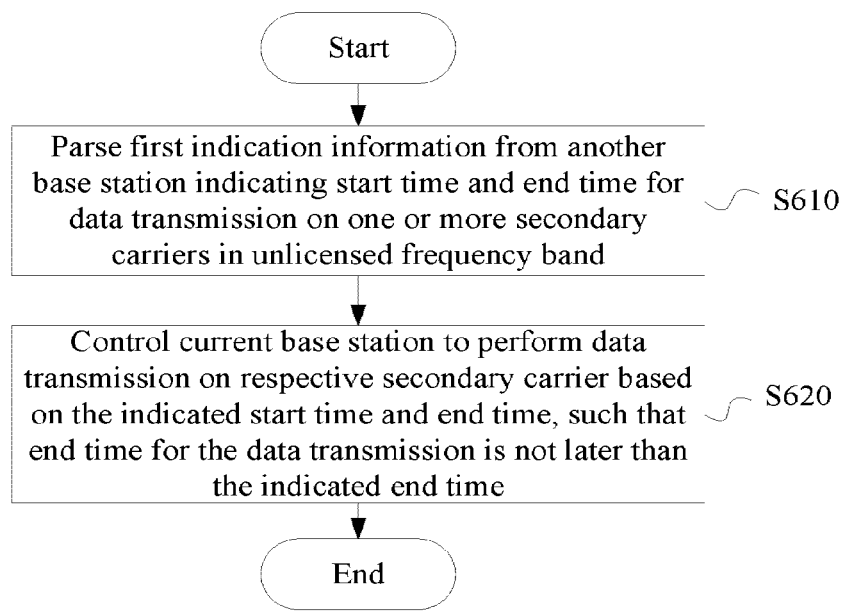
FIG. 6 is a flowchart showing a process example of a wireless communication method for base station side according to an embodiment of the present disclosure.

FIG. 6 shows a wireless communication method for base station side according to an embodiment of the present disclosure, which may be applied to a base station other than an eNB Head. The method includes step S610 of parsing first indication information from another base station. The first indication information indicates a start time and an end time for data transmission on one or more secondary carriers in an unlicensed frequency band. The method further includes a step S620 of controlling a current base station to perform data transmission on the secondary carrier based on the indicated start time and the indicated end time, such that an end time for the data transmission is not later than the indicated end time.

Furthermore, embodiments of the present disclosure also include an electronic device for the side of mobility management entity. The electronic device may be configured to specify a base station to serve as the above eNB Head.

Figure 7:
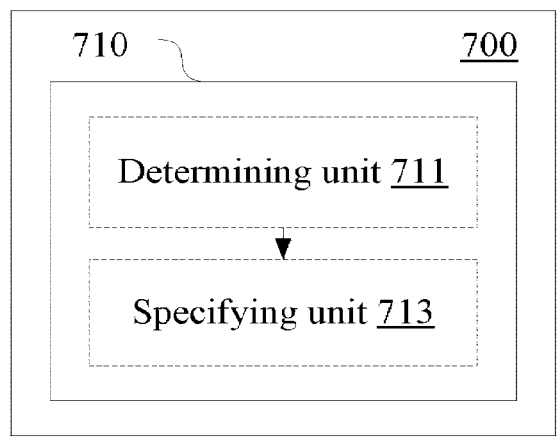
FIG. 7 is a block diagram showing a configuration example of a wireless communication device on the side of mobility management entity according to an embodiment of the present disclosure.

As shown in FIG. 7, an electronic device 700 according to the embodiment includes at least one processor 710. The processor 710 includes a determining unit 711 and a specifying unit 713.

The determining unit 711 is configured to determine multiple base stations operating in the same unlicensed frequency band. In other words, the determining unit 711 is configured to define eNBs operating in the same unlicensed frequency band (carrier) as a frequency reuse cluster.

The specifying unit 713 is configured to specify and notify one of the multiple base stations described above to determine a start time and end time for data transmission of each of the multiple base stations described above on one or more secondary carriers in the unlicensed frequency band.

According to an embodiment, the specifying unit 713 may specify the base station (eNB Head) for determining the start time and the end time based on positions and/or traffic load of the multiple base stations.

An example manner for selecting the eNB Head is described with reference to FIG. 17. In the example shown in FIG. 17, an eNB located at the center area of the shown region is taken as an eNB Head of the region, alternatively, an eNB with a large transmission power in the region may be taken as an eNB Head of the region. In addition, the eNB Head may also be specified by a service gateway (S-GW) or a packet data gateway (P-GW) in a semi-static manner based on data traffic within a certain time period, and an eNB with large data traffic (frequent LBT detections) is selected as an eNB Head within a region. Moreover, the eNB Head may also be specified based on a combination of the above manners.

Furthermore, as described above, embodiments of the present disclosure also involve an aspect for a base station to select reasonable usage of a carrier in an unlicensed frequency band, thereby achieving efficient frequency reuse on the unlicensed frequency band.

Figure 8:
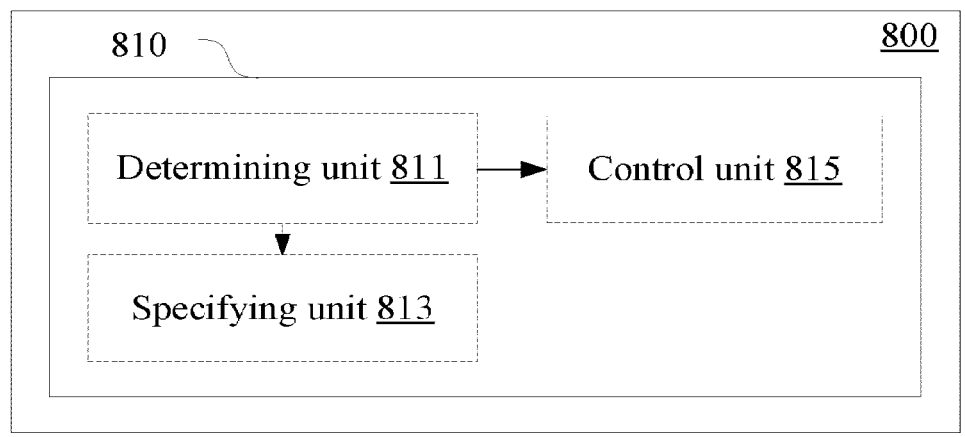
FIG. 8 is a block diagram showing a configuration example of a wireless communication device on the side of mobility management entity according to another embodiment.

As shown in FIG. 8, an electronic device 800 for MME side according to an embodiment includes at least one processor 810. The processor 810 includes a determining unit 811, a specifying unit 813 and a control unit 815. A part of configurations of the determining unit 811 and the specifying unit 813 are similar to those of the aforementioned determining unit 711 and specifying unit 713, and are not described repeatedly hereinafter.

The determining unit 811 is further configured to determine a reference number of base stations using each secondary carrier. In addition, the control unit 815 is configured to control to send information on the reference number to multiple base stations managed by the MME.

Specifically, the determining unit 811 may determine a corresponding reference number based on historical load and an interference situation of each secondary carrier, such that interference is lower than a predetermined level in a case where the number of base stations is less than the reference number.

Figure 9:
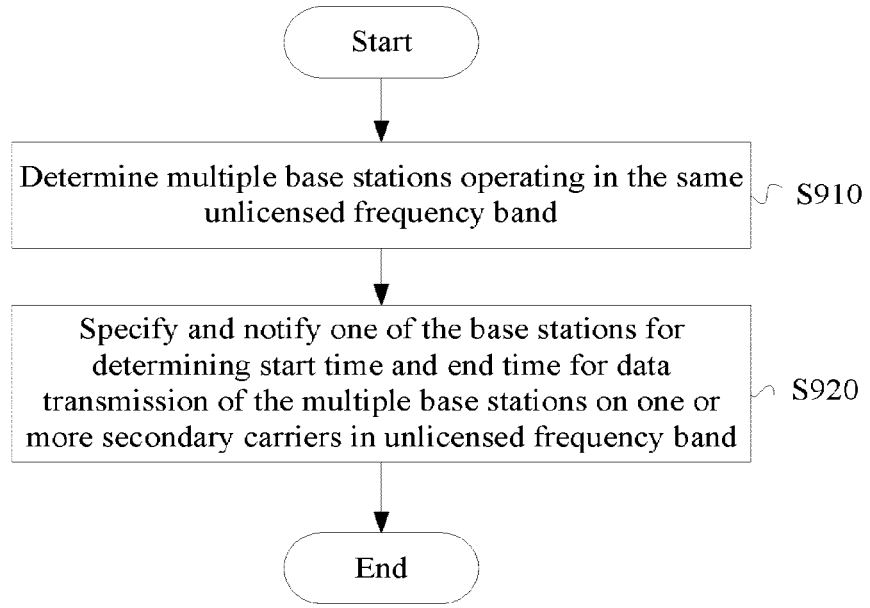
FIG. 9 is a flowchart showing a process example of a wireless communication method on the side of mobility management entity according to an embodiment of the present disclosure.

FIG. 9 shows a communication control method for MIME side according to an embodiment. In step S910, multiple base stations operating in the same unlicensed frequency band are determined. In step S920, one of the multiple base stations is specified and notified for determining a start time and en end time for data transmission of the multiple base stations on one or more secondary carriers in the unlicensed frequency band.

Furthermore, embodiments of the disclosure also include the following embodiments.

Figure 10:
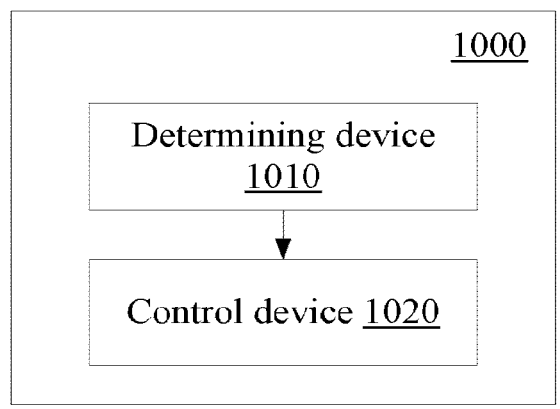
FIG. 10 is a block diagram showing a configuration example of a wireless communication device for base station side according to an embodiment of the present disclosure.

As shown in FIG. 10, a wireless communication device for base station side includes a determining device 1010 and a control device 1020.

The determining device 1010 is configured to determine, one or more secondary carriers in an unlicensed frequency band, a start time and an end time for data transmission on a respective secondary carrier. The control device 1020 is configured to control to send indication information regarding the start time and the end time to another base station.

Figure 11:
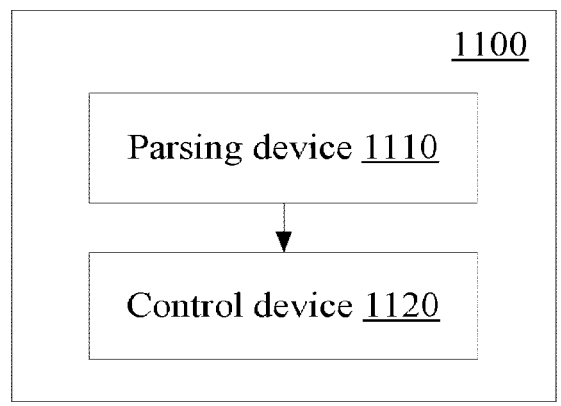
FIG. 11 is a block diagram showing a configuration example of a wireless communication device for base station side according to another embodiment of the present disclosure.

As shown in FIG. 11, a wireless communication device for base station side includes a parsing device 1110 and a control device 1120.

The parsing device 1110 is configured to parse indication information from another base station. The indication information indicates a start time and an end time for data transmission on one or more secondary carriers in an unlicensed frequency band. The control device 1120 is configured to control a current base station to perform data transmission on a respective secondary carrier based on the indicated start time and the indicated end time, such that an end time for the data transmission on the secondary carrier is not later than the indicated end time.

Figure 12:
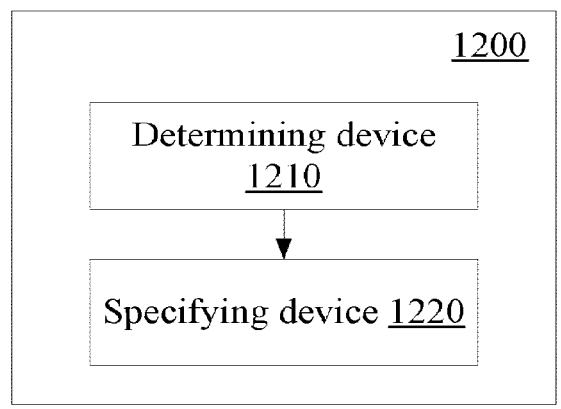
FIG. 12 is a block diagram showing a configuration example of a wireless communication device on the side of mobility management entity according to an embodiment of the present disclosure.

As shown in FIG. 12, a wireless communication device for base station side includes a determining device 1210 and a specifying device 1220.

The determining device 1210 is configured to determine multiple base stations operating in the same unlicensed frequency band. The specifying device 1220 is configured to specify and notify one of the multiple base stations for determining a start time and an end time for data transmission of the multiple base stations on one or more secondary carriers in the unlicensed frequency band.

For example, steps of the above methods and modules and/or units of the above devices may be implemented with software, firmware, hardware or a combination thereof. In the case where the steps and modules and/or units are implemented with software or firmware, programs constituting the software for implementing the above methods are installed in a computer with a dedicated hardware structure (e.g. a general computer 1300 shown in FIG. 13) from a storage medium or a network. The computer is capable of implementing various functions when being installed with various programs.

Figure 13:
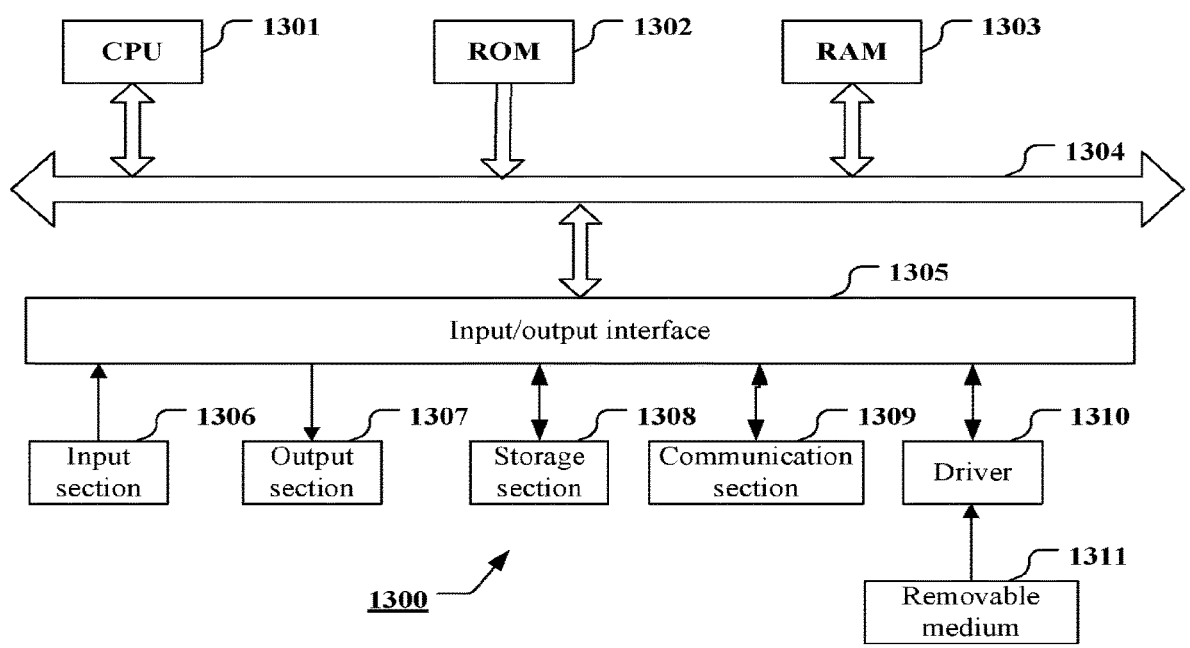
FIG. 13 is a block diagram showing an exemplary structure of a computer for implementing the method and the device according to the present disclosure.

In FIG. 13, a central processing unit (CPU) 1301 performs various processing based on a program stored in a read-only memory (ROM) 1302 or a program loaded to a random access memory (RAM) 1303 from a storage section 1308. Data required in the various processing of the CPU 1301 may be stored in the RAM 1303 as needed. The CPU 1301, the ROM 1302 and the RAM 1303 are linked with one another via a bus 1304. An input/output interface 1305 is also linked to the bus 1304.

The following components are linked to the input/output interface 1305: an input section 1306 (including a keyboard, a mouse and the like), an output section 1307 (including a display such as a cathode ray tube (CRT), a liquid crystal display (LCD), a speaker and the like), a storage section 1308 (including hard disc and the like), and a communication section 1309 (including a network interface card such as a LAN card, a modem and the like). The communication section 1309 performs communication processing via a network such as the Internet. A driver 1310 may also be linked to the input/output interface 1305 if needed. If needed, a removable medium 1311 such as a magnetic disc, an optical disc, a magnetic optical disc and a semiconductor memory may be installed in the driver 1310, so that the computer program read therefrom is installed in the storage section 1308 as appropriate.

In the case where the foregoing series of processing is implemented with software, programs forming the software are installed from a network such as the Internet or a memory medium such as the removable medium 1311.

It should be appreciated by those skilled in the art that the memory medium is not limited to the removable medium 1311 shown in FIG. 13, which has program stored therein and is distributed separately from the device so as to provide the programs to users. The removable medium 1311 may be, for example, a magnetic disc (including a floppy disc (registered trademark)), a compact disc (including a compact disc read-only memory (CD-ROM) and a digital versatile disc (DVD), a magneto optical disc (including mini disc (MD)(registered trademark)), and a semiconductor memory. Alternatively, the memory medium may be the hard discs included in ROM 1302 and the storage section 1308, in which programs are stored, and can be distributed to users along with the device in which they are incorporated.

A computer readable medium storing machine-readable instruction codes is further provided according to the embodiments of the present disclosure. The method according to the above embodiments of the present disclosure can be performed when the instruction codes are read and executed by a machine.

Accordingly, a storage medium for carrying the program product described above in which the machine-readable instruction codes are stored is also includes in the present disclosure. The storage medium includes but is not limited to a floppy disc, an optical disc, a magnetic optical disc, a memory card, a memory stick and the like.

The embodiments of the present disclosure further relate to the following electronic device. In a case where the electronic device is used on base station side, the electronic device may be implemented as any type of evolved node B (eNB), such as a macro eNB and a small eNB. The small eNB may be an eNB of a cell having a smaller coverage range than the macro cell, such as a pico-cell eNB, a micro eNB and a family (femto) eNB. Alternatively, the electronic device may be implemented as any other types of base stations, such as a NodeB and a base transceiver station (BTS). The electronic device may include an entity (also referred to a base station device) configured to control wireless communication, and one or more remote radio heads (RRHs) arranged at a position different from that of the entity. In addition, various type of terminals described below may operate as a base station by temporarily or semi-persistently performing a function of the base station.

In a case where the electronic device is used on a side of a user equipment, the electronic device may be implemented as a mobile terminal (such as a smart phone, a panel personnel computer (PC), a notebook PC, a portable game terminal, a portable/dongle mobile router and a digital camera) or an onboard terminal (such as a car navigation device).

Moreover, the electronic device may be a wireless communication module mounted on each of the above terminals (such as an integrated circuit module including one or more wafers).

[Application Examples Regarding Terminal Device]

Figure 14:
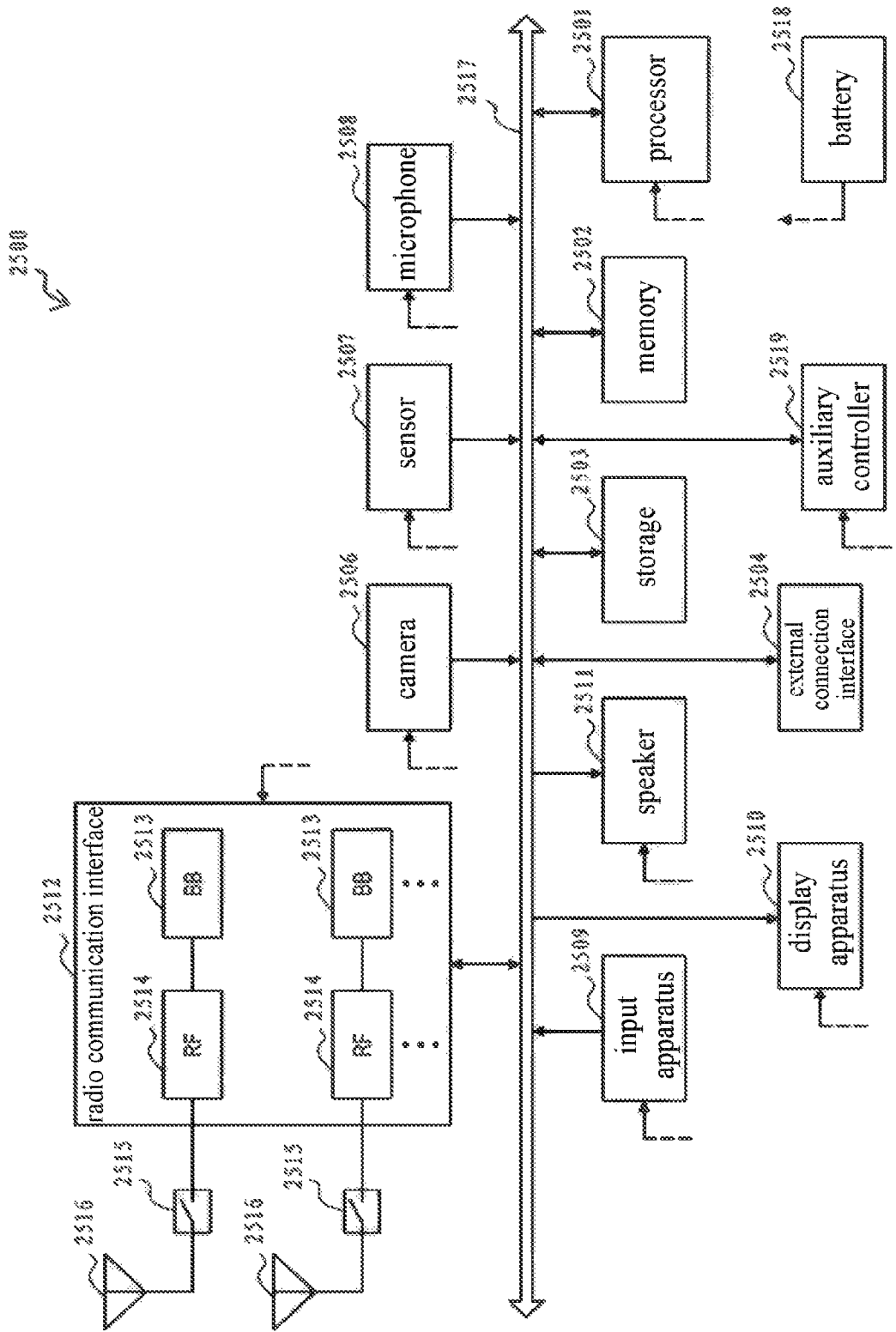
FIG. 14 is a block diagram showing an example of a schematic configuration of a smart phone to which the technology according to the present disclosure may be applied.

FIG. 14 is a block diagram showing an example of a schematic configuration of a smart phone 2500 to which the technology according to the present disclosure may be applied.

The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518 and an auxiliary controller 2519.

The processor 2501 may be for example a CPU or a system on chip (SoC), and controls functions of an application layer and an additional layer of the smart phone 2500. The memory 2502 includes a RANI and a ROM, and stores programs executed by the processor 2501 and data. The storage 2503 may include a storage medium such as a semiconductor memory and a hard disk. The external connection interface 2504 refers to an interface for connecting an external device (such as a memory card and a universal serial bus (USB) device) to the smart phone 2500.

The camera 2506 includes an image sensor (such as a charge-coupled device (CCD) and a complementary metal oxide semiconductor (CMOS)), and generates a captured image. The sensor 2507 may include a group of sensors such as a measurement sensor, a gyroscope sensor, a geomagnetic sensor and an acceleration sensor. The microphone 2508 converts voice inputted to the smart phone 2500 into an audio signal. The input apparatus 2509 includes for example a touch sensor configured to detect touch on a screen of the display apparatus 2510, a keypad, a keyboard, a button or a switch, and receives an operation or information inputted by the user. The display apparatus 2510 includes a screen (such as a liquid crystal display (LCD) and an organic light-emitting diode (OLED) display), and displays an output image of the smart phone 2500. The speaker 2511 converts the audio signal outputted from the smart phone 2500 into voice.

The radio communication interface 2512 supports any cellular communication scheme (such as LTE and LTE-advanced), and performs wireless communication. The radio communication interface 2512 may include for example a baseband (BB) processor 2513 and a radio frequency (RF) circuit 2514. The BB processor 2513 may perform for example coding/decoding, modulation/demodulation and multiplexing/demultiplexing, and perform various types of signal processing for wireless communication. Meanwhile, the RF circuit 2514 may include for example a mixer, a filter and an amplifier, and transmit and receive a wireless signal via the antenna 2516. The radio communication interface 2512 may be a chip module on which the BB processor 2513 and the RF circuit 2514 are integrated. As shown in FIG. 14, the radio communication interface 2512 may include multiple BB processors 2513 and multiple RF circuits 2514. Although FIG. 14 shows the example in which the radio communication interface 2512 includes multiple BB processors 2513 and multiple RF circuits 2514, the radio communication interface 2512 may include a single BB processor 2513 or a single RF circuit 2514.

In addition to the cellular communication scheme, the radio communication interface 2512 may support an additional type of wireless communication scheme, such as a short-distance wireless communication scheme, a near field communication scheme and a wireless local area network (LAN) scheme. In this case, the radio communication interface 2512 may include a BB processor 2513 and a RF circuit 2514 for each of the wireless communication schemes.

Each of the antenna switches 2515 switches a connection destination of the antenna 2516 between multiple circuits (such as circuits for different wireless communication schemes) included in the radio communication interface 2512.

Each of the antennas 2516 includes one or more antenna elements (such as multiple antenna elements included in the MIMO antenna), and is used for the radio communication interface 2512 to transmit and receive a wireless signal. As shown in FIG. 14, the smart phone 2500 may include multiple antennas 2516. Although FIG. 13 shows the example in which the smart phone 2500 includes multiple antennas 2516, the smart phone 2500 may include a single antenna 2516.

In addition, the smart phone 2500 may include antennas 2516 for each wireless communication scheme. In this case, the antenna switch 2515 may be omitted in the configuration of the smart phone 2500.

The processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512 and the auxiliary controller 2519 are connected with one another via the bus 2517. The battery 2518 supplies power to the modules of the smart phone 2500 shown in FIG. 13 via a feed line. The feed line is partially shown with a dash line in FIG. 14. The auxiliary controller 2519 operates a minimum necessary function of the smart phone 2500 in a sleep mode.

In the smart phone 2500 shown in FIG. 14, a transceiving unit of a user equipment can be implemented by the radio communication interface 2512. At least a part of the functions of function units of the user equipment may be implemented by the processor 2501 and the auxiliary controller 2519. For example, the auxiliary control 2519 may execute a part of functions of the processor 2501, to reduce power consumption of the battery 2518. In addition, the processor 2501 or the auxiliary controller 2519 may perform at least a part of functions of the functional units of the user equipment by executing programs stored in the memory 2502 or the storage 2503.

[Application Examples Regarding Base Station]

Figure 15:
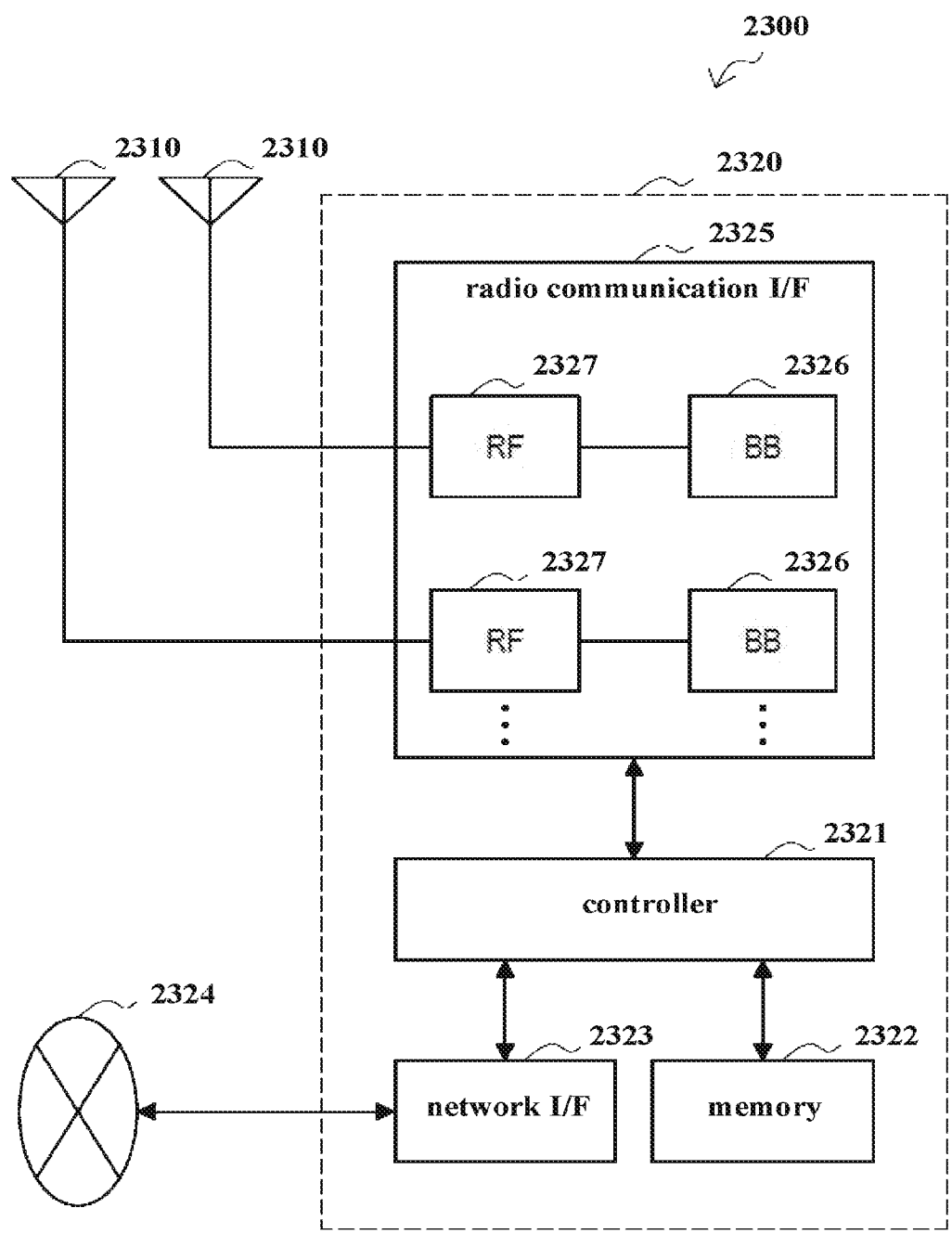
FIG. 15 is a block diagram showing an example of a schematic configuration of an evolved base station (eNB) to which the technology according to the present disclosure may be applied.

FIG. 15 is a block diagram showing an example of a schematic configuration of an eNB to which the technology according to the present disclosure may be applied. An eNB 2300 includes one or more antennas 2310 and a base station device 2320. The base station device 2320 may be connected to each of the antennas 2310 via a radio frequency (RF) cable.

Each of the antennas 2310 includes one or more antennal elements (such as multiple antenna elements included in a multiple-input multiple-output (MIMO) antenna), and is used for the base station device 2320 to transmit and receive a wireless signal. As shown in FIG. 15, the eNB 2300 may include multiple antennas 2310. For example, the multiple antennas 2310 may be compatible with multiple frequency bands used by the eNB 2300. Although FIG. 15 shows the example in which the eNB 2300 includes multiple antennas 2310, the eNB 2300 may include a single antenna 2310.

The base station device 2320 includes a controller 2321, a memory 2322, a network interface 2323 and a radio communication interface 2325.

The controller 2321 may be for example a CPU or a DSP, and operates various functions of a high layer of the base station device 2320. For example, the controller 2321 generates a data package based on data in a signal processed by the radio communication interface 2325, and transfers the generated package via the network interface 2323. The controller 2321 may bundle data from multiple baseband processors to generate a bundled package, and transfers the generated bundled package. The controller 2321 may has a logical function for performing for example radio resource control, radio bearer control, mobility management and admission control and scheduling. The control may be performed in conjunction with a nearby eNB or a core network node. The memory 2322 includes a RAM and a ROM, and stores programs to be executed by the controller 2321 and various types of control data (such as a terminal list, transmission power data and scheduling data).

The network interface 2323 is a communication interface for connecting the base station device 2320 to a core network 2324. The controller 2321 may communicate with a core network node or another eNB via the network interface 2323. In this case, the eNB 2300 may be connected with the core network node or another eNB via a logic interface (such as S1 interface and X2 interface). The network interface 2323 may be a wired communication interface or a radio communication interface for radio backhaul. If the network interface 2323 is the radio communication interface, the network interface 2323 may use a higher frequency band for wireless communication as compared with a frequency band used by the radio communication interface 2325.

The radio communication interface 2325 supports any cellular communication scheme (such as Long Term Evolution (LTE) and LTE-advanced), and provides a wireless connection to a terminal located in a cell of the eNB 2300 via the antenna 2310. The radio communication interface 2325 may generally include for example a BB processor 2326 and an RF circuit 2327. The BB processor 2326 may perform for example coding/decoding, modulation/demodulation and multiplexing/demultiplexing, and performs various types of signal processing of a layer (such as L1, Media Access Control (MAC), Radio Link Control (RLC) and Packet Data Convergence Protocol (PDCP)). Instead of the controller 2321, the BB processor 2326 may have a part or all of the above logical functions. The BB processor 2326 may be a memory for storing communication control programs, or a module including a processor and a related circuit configured to execute programs. Updating the program may allow the function of the BB processor 2326 to be changed. The module may be a card or blade inserted into the slot of the base station device 2320. Alternatively, the module may be a chip mounted on the card or the blade. Meanwhile, the RF circuit 2327 may include for example a mixer, a filter and an amplifier, and transmit and receive a wireless signal via the antenna 2310.

As shown in FIG. 15, the radio communication interface 2325 may include multiple BB processors 2326. For example, the multiple BB processors 2326 may be compatible with the multiple frequency bands used by the eNB 2300. As shown in FIG. 15, the radio communication interface 2325 may include multiple RF circuits 2327. For example, the multiple RF circuits 2327 may be compatible with multiple antenna elements. Although an example in which the radio communication interface 2325 includes multiple BB processors 2326 and multiple RF circuits 2327 is shown in FIG. 15, the radio communication interface 2325 may also include a single BB processor 2326 and a single RF circuit 2327.

In the eNB2300 shown in FIG. 15, a transceiving device of a communication device for base station side may be implemented by the radio communication interface 2325. At least a part of functions of the units described by referring to FIGS. 1, 2, 4 and 5 may also be implemented by the controller 2321. For example, the controller 2321 may perform at least a portion of the functions of the units described by referring to FIGS. 1, 2, 4 and 5 by executing the programs stored in the memory 2322.

In the description of specific embodiments of the present disclosure above, features described and/or illustrated in one embodiment may be used in one or more other embodiments in a same or similar manner, may be combined with features in other embodiments, or substituted for features in other embodiments.

It should be noted that, terms "including/comprising" used herein refer to existing of features, elements, steps or components, but does not exclude existing or adding of one or more other features, elements, steps or components.

In the above embodiments and examples, reference numerals of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed chronologically in other time order, in parallel or independently. Therefore, the order for performing the method described in the description does not limit the technical scope of the present disclosure.

Although the present disclosure is disclosed by description of the embodiments of the present disclosure above, it should be understood that all the embodiments and examples described above are only exemplary rather than restrictive. For those skilled in the art, various changes, improvements or equivalents may be designed on the present disclosure within the spirit and scope of the appended claims. The changes, the improvements or the equivalents should be regarded as falling within the protection scope of the present disclosure.

The invention claimed is:

1. A base station, comprising:
processing circuitry configured to
in response to a notification from a mobility management entity, determine, for one or more secondary carriers in an unlicensed frequency band, a start time and an end time for data transmission on a respective secondary carrier;
control to send first indication information regarding the start time and the end time to another base station;
parse second indication information from the another base station, wherein the second indication information indicates the secondary carrier which is being used by the another base station; and
determine the number of base stations using each of the secondary carriers based on the second indication information and the secondary carrier which is being used by the base station.

2. The base station according to claim 1, wherein determining the start time and the end time comprises:
performing listen before talk on each of the secondary carriers to determine a maximum occupation time of the secondary carrier, and determining a start time and an end time of the maximum occupation time as the start time and the end time, respectively.

3. The base station according to claim 2, wherein the start time and the end time are determined periodically.

4. The base station according to claim 2, wherein when data transmission is to be performed by the base station on one of the secondary carriers, the start time and the end time corresponding to the secondary carrier are determined.

5. The base station according to claim 1, wherein sending the first indication information comprises:
sending the first indication information in a special subframe.

6. The base station according to claim 5, wherein the length of a downlink pilot timeslot of the special subframe is eleven or twelve orthogonal frequency division multiplexing symbols.

7. The base station according to claim 1, wherein sending the first indication information comprises:
sending the first indication information on a multicast broadcast single frequency network subframe.

8. The base station according to claim 1, wherein the processing circuitry is further configured to:
determine to enable or disable the secondary carrier by the base station based on the determined number and a reference number of base stations using each of the secondary carriers.

9. The base station according to claim 8, wherein the processing circuitry is further configured to:
parse third indication information from a mobility management entity, wherein the third indication information indicates the reference number of base stations using each of the secondary carriers.

10. The base station according to claim 9, wherein the third indication information is received via S1 interface.

11. The base station according to claim 8, wherein
interference is lower than a predetermined level if the number of base stations is less than the reference number.

12. The base station according to claim 1, wherein the processing circuitry is further configured to:
control to send fourth indication information to another base station, wherein the fourth indication information indicates the secondary carrier which is being used by the base station.

13. The base station according to claim 12, wherein the second indication information and the fourth indication information are received and sent respectively via X2 interface.

14. A base station, comprising:
processing circuitry configured to
parse first indication information from another base station, wherein the first indication information indicates a start time and an end time for data transmission on one or more secondary carriers in an unlicensed frequency band, and the start time and the end time are determined by the another base station in response to a notification from a mobility management entity;
control to perform data transmission on a respective secondary carrier based on the indicated start time and the indicated end time, such that the data transmission on the secondary carrier ends before the indicated end time;
parse second indication information from the another base station, wherein the second indication information indicates the secondary carrier which is being used by the another base station; and
determine the number of base stations using each of the secondary carriers based on the second indication information and the secondary carrier which is being used by the base station.

15. The base station according to claim 14, wherein the processing circuitry is further configured to:
parse third indication information from a mobility management entity, wherein the third indication information indicates a reference number of base stations using each of the secondary carriers.

16. The base station according to claim 15, wherein
interference is lower than a predetermined level if the number of base stations is less than the reference number.

17. The base station according to claim 14, wherein the processing circuitry is further configured to:
control to send fourth indication information to another base station, wherein the fourth indication information indicates the secondary carrier which is being used by the base station.

* * * * *